(12) United States Patent
Takeda

(10) Patent No.: US 8,477,574 B2
(45) Date of Patent: Jul. 2, 2013

(54) OPTICAL DISK DEVICE

(75) Inventor: Futoshi Takeda, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/482,172

(22) Filed: May 29, 2012

(65) Prior Publication Data

US 2012/0314550 A1 Dec. 13, 2012

(30) Foreign Application Priority Data

Jun. 7, 2011 (JP) .................................. 2011-127525

(51) Int. Cl.
*G11B 7/00* (2006.01)
(52) U.S. Cl.
USPC ....................................................... 369/44.23
(58) Field of Classification Search
None
See application file for complete search history.

(56) References Cited

U.S. PATENT DOCUMENTS 8,149,671 B2 * 4/2012 Sato et al. .................. 369/53.45
2008/0062851 A1 3/2008 Hayashi

FOREIGN PATENT DOCUMENTS

| JP | 2007-257803 A | 10/2007 |
| JP | 2008-71394 A | 3/2008 |
| JP | 2009-140573 A | 6/2009 |
| JP | 2009-230781 A | 10/2009 |

* cited by examiner

*Primary Examiner* — Hoa T Nguyen
*Assistant Examiner* — Mark Fischer
(74) *Attorney, Agent, or Firm* — Keating & Bennett, LLP

(57) ABSTRACT

An optical disk device is configured such that when an optical disk including three or more recording layers on one side is inserted into the optical disk device, a movable lens position adjustment device performs adjustment using as an index a tracking error signal provided with a limit to an amount of movement of a movable lens for spherical aberration correction at start-up of the optical disk device and sets an upper limit to the number of retries of the adjustment at the recording layer farthest away from the side on which the laser beam is incident to 1 or more.

4 Claims, 6 Drawing Sheets

OPTICAL DISK DEVICE

BACKGROUND OF THE INVENTION

1. Field of the Invention

The present invention relates to an optical disk device, and more particularly relates to an optical disk device that is compatible with optical disks including three or more recording layers on one side.

2. Description of the Related Art

With a conventional optical disk device that is compatible with a BD (Blu-ray Disc; registered trademark)-DL (double-layer BD), adjustment of the various recording layers of the BD-DL is carried out by the following procedure upon start-up when the BD-DL is inserted into the optical disk device.

First, the optical disk is rotated, and the number of recording layers on the optical disk is acquired by performing a focus search. Next, spherical aberrations are corrected with an L0-use setting value that has been measured ahead of time in the course of manufacturing the device, etc., after which automatic gain control (automatic amplitude adjustment) of a focus error signal is performed, and focus control is performed at the recording layer L0 that is far away from the side on which the laser beam is incident. Then, rough adjustment of the spherical aberration correction is performed using a tracking error signal as an index, after which various kinds of adjustments related to the tracking error signal (such as balance adjustment, offset adjustment, and amplitude adjustment) are performed, automatic gain control of the tracking error signal is performed, and tracking control is performed. Afterward, furthermore, fine adjustment of the spherical aberration correction is performed using an RF signal as an index, and loop gain adjustment of focus control and loop gain adjustment of tracking control are carried out.

Afterward, a focus jump is made to the recording layer L1 closest to the side on which the laser beam is incident, and spherical aberrations are corrected with an L1-use setting value that has been measured ahead of time in the course of manufacturing the device, etc., after which focus control is performed on L1. Then, rough adjustment of the spherical aberration correction is performed, after which tracking control is performed. Afterward, furthermore, fine adjustment of the spherical aberration correction is performed, loop gain adjustment of focus control and loop gain adjustment of tracking control are carried out, and start-up is ended. Ending this start-up makes it possible to reproduce the BD-DL.

Thus, in the start-up operation when a BD-DL is inserted into the device, the rough adjustment of the spherical aberration correction by pulling focus control into the recording layer L0 is performed before the tracking control is placed in an ON state, that is, before address acquisition, so even if the focus control, which is supposed to be performed on the recording layer L0, is mistakenly performed on the recording layer L1, the control means of the optical disk device could not immediately detect this error.

Therefore, if focus control that is supposed to be performed on the recording layer L0 is instead mistakenly performed on the recording layer L1, in the rough adjustment of spherical aberration correction at the recording layer L0 (the focus is actually on the recording layer L1), the movable lens used for spherical aberration correction moves to the position on the recording layer L1 at which spherical aberration is roughly best, after which various kinds of adjustments are made related to the tracking error signal, and at the stage when tracking control is placed in an ON state and an address has been acquired, the control means of the optical disk device can detect that the focus control has been mistakenly performed on the recording layer L1, and an attempt is made to pull the focus control again into the recording layer L0.

Note that a limit is provided to the amount of movement of the movable lens used for spherical aberration correction in rough correction of the spherical aberration correction at the recording layer L0 in order to avoid ending up in a situation in which an error occurs in the measurement for some factor (such as stray light) when the focus control is being properly performed on the recording layer L0, and this causes the movable lens for spherical aberration correction to move so far that the tracking control cannot be placed in an ON state.

At present, as optical disks including three or more recording layers on one side, there are BDs that are compliant with a BDXL standard established in June of 2010.

For example, in the start-up operation in a case in which a BD-QL (quad-layer BD) compliant with the BDXL standard has been inserted into a device, it is possible that while focus control is supposed to be performed on the recording layer L0 that is farthest away from the side on which the laser beam is incident, the focus control will instead be mistakenly performed on a recording layer L3 that is closest to the side on which the laser beam is incident.

At the current value of the limit provided for the amount of movement of the movable lens for spherical aberration correction in rough adjustment of spherical aberration correction at the recording layer L0, when focus control that is supposed to be performed on the recording layer L0 is instead mistakenly performed on the recording layer L3, in rough adjustment of the spherical aberration correction at the recording layer L0 (the focus is actually on the recording layer L3), the movable lens for spherical aberration correction can only be moved to a position that is quite far away from the position at which the spherical aberration is roughly best at the recording layer L3. Therefore, a large deviation occurs in the various kinds of adjustments related to the tracking error signal, so there is the risk of ending up in a situation in which the tracking control cannot be placed in an ON state.

In light of this, a measure is conceivable in which the limit provided for the amount of movement of the movable lens for spherical aberration correction in rough adjustment of the spherical aberration correction at the recording layer L0 is expanded over its present value, but if this limit is expanded too much, an error may occur in the measurement for some factor (such as stray light) when the focus control is being properly performed on the recording layer L0, and this will cause the movable lens for spherical aberration correction to move so far that there is the risk of ending up in a situation in which the tracking control cannot be placed in an ON state.

Note that techniques relating to the correction of spherical aberration are disclosed in Japanese Patent Application Laid-Open Publication No. 2009-230781, Japanese Patent Publication No. 4584172, Japanese Patent Publication No. 4258542, and Japanese Patent Application Laid-Open Publication No. 2009-140573, but there is no disclosure or implication that relates to the limit provided for the amount of movement of the movable lens for spherical aberration correction in rough adjustment of spherical aberration correction at the recording layer L0 at start-up.

SUMMARY OF THE INVENTION

In light of the aforementioned circumstances, preferred embodiments of the present invention provide an optical disk device which can avoid ending up in a situation in which the tracking control cannot be placed in an ON state at start-up when an optical disk including three or more recording layers on one side is inserted into the optical disk device.

An optical disk device according to a preferred embodiment of the present invention is compatible with optical disks including three or more recording layers on one side, and includes an optical pickup that shines light on an optical disk and that detects light reflected from the optical disk using a photodetector, a tracking error signal generation device that generates a tracking error signal by processing an electrical signal that is output from the photodetector, and a movable lens position adjustment device that controls adjustment of the position of a movable lens for spherical aberration correction disposed in the optical system of the optical pickup, wherein when an optical disk including three or more recording layers on one side is inserted into the optical disk device, the movable lens position adjustment device performs adjustment using as an index the tracking error signal provided with a limit to the amount of movement of the movable lens for spherical aberration correction upon start-up of the optical disk device and sets the upper limit to a number of retries of the adjustment at the recording layer farthest away from the side on which the laser beam is incident to 1 or more.

With such a constitution (first constitution), when a BD including three or more recording layers on one side is inserted into the optical disk device, even if focus control that is supposed to be performed on the recording layer L0 that is farthest away from the side on which the laser beam is incident is instead mistakenly performed on a recording layer close to the side on which the laser beam is incident (e.g., a recording layer other than L1), the movable lens for spherical aberration correction can be moved to the position at which spherical aberration is roughly the best at the recording layer closest to the side on which the laser beam is incident in rough adjustment of the spherical aberration correction at the recording layer farthest away from the side on which the laser beam is incident (what is actually in focus is the recording layer close to the side on which the laser beam is incident). Therefore, no large deviation occurs in the various kinds of adjustments related to the tracking error signal. Accordingly, if focus control that is supposed to be performed on the recording layer farthest away from the side on which the laser beam is incident is instead mistakenly performed on the recording layer closest to the side on which the laser beam is incident, it is possible to avoid ending up in a situation in which the tracking control cannot be placed in an ON state.

Moreover, with such a constitution, there is no longer a need to expand the limit provided for the amount of movement of the movable lens for spherical aberration correction in the aforementioned adjustment, so it is possible to avoid ending up in a situation in which an error occurs in the measurement for some factor (such as stray light) when the focus control is being properly performed on the recording layer farthest away from the side on which the laser beam is incident, and this causes the movable lens for spherical aberration correction to move so far that the tracking control cannot be placed in an ON state.

In addition, the aforementioned adjustment in recording other than at the recording layer farthest away from the side on which the laser beam is incident is executed after address acquisition, and no error occurs in the recording layer, so it is desirable to adopt another constitution (second constitution) configured such that in the above-described first constitution, when the optical disk including three or more recording layers on one side is inserted into the optical disk device, the movable lens position adjustment device sets the upper limit to the number of retries of the aforementioned adjustment in recording other than at the recording layer farthest away from the side on which the laser beam is incident to zero.

Furthermore, from the standpoint of being able to avoid ending up in a situation in which tracking control cannot be placed in an ON state even when focus control that is supposed to be performed on the recording layer farthest away from the side on which the laser beam is incident is instead mistakenly performed on the recording layer closest to the side on which the laser beam is incident, it is desirable to adopt a constitution (third constitution) such that, in the aforementioned first or second constitution, the product of multiplying the absolute value of the aforementioned limit by the upper limit to the number of retries for the aforementioned adjustment at the recording layer farthest away from the side on which the laser beam is incident is equal to or greater than the maximum distance from the standard between the recording layer that is farthest away from the side on which the laser beam is incident and the recording layer that is closest to the side on which the laser beam is incident on an optical disk with the greatest number of recording layers out of the optical disks including three or more recording layers on one side. Moreover, it is more desirable to use another constitution (fourth constitution) configured such that in the third constitution, the upper limit to the number of retries for the aforementioned adjustment is smallest.

In addition, in the first through third constitutions described above, it is desirable that the optical disk device be compatible with a BD that is complaint with the BDXL standard.

With the optical disk device according to various preferred embodiments of the present invention including any of the first through fourth constitutions, it is possible to avoid ending up in a situation in which tracking control cannot be placed in an ON state at start-up when an optical disk including three or more recording layers on one side is inserted into the optical disk device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
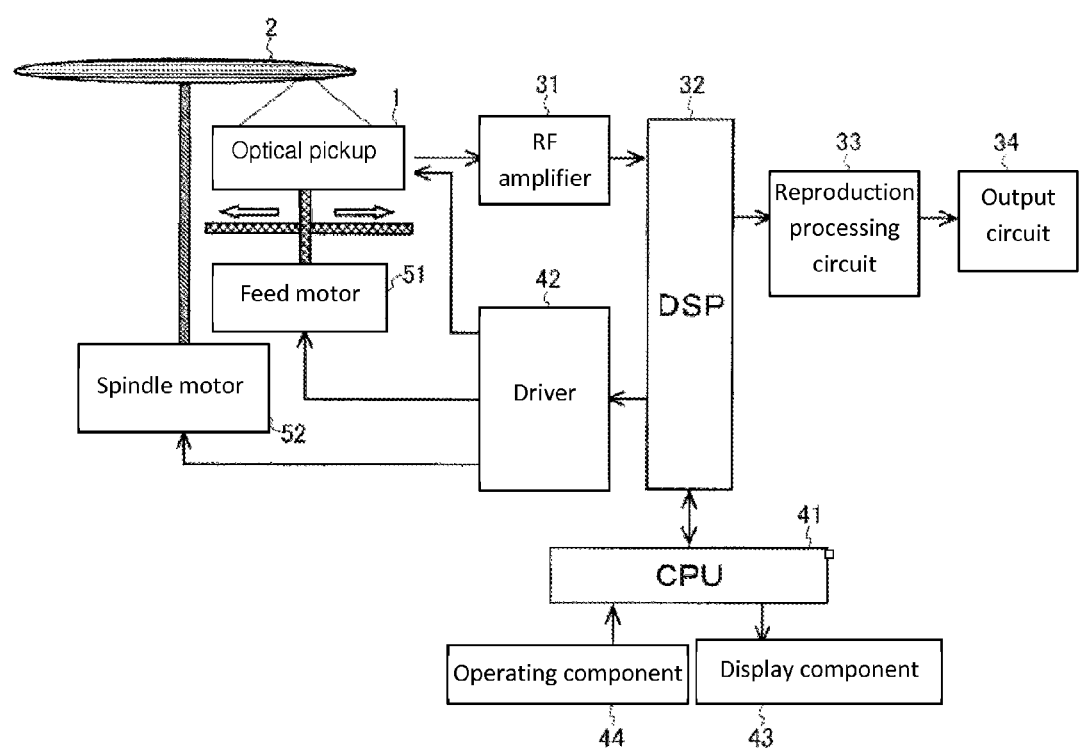
FIG. 1 is a diagram showing the schematic configuration of the optical disk device according to one preferred embodiment of the present invention.

Preferred embodiments of the present invention will be described below with reference to the drawings. The schematic configuration of the optical disk device according to one preferred embodiment of the present invention is shown in FIG. 1.

The optical disk device according to one preferred embodiment of the present invention is an optical disk device that is preferably compatible with optical disks including multiple layers on one side and includes an optical pickup 1, an RF amplifier 31, a DSP (digital sound processor) 32, a reproduction processing circuit 33, an output circuit 34, a CPU (central processing unit) 41, a driver 42, a display component 43, an operating component 44, a feed motor 51, and a spindle motor 52.

The optical pickup 1 reads various kinds of information such as audio information and video information recorded to an optical disk 2 by directing a light beam at the optical disk 2. The optical pickup 1 can direct an infrared laser beam with a wavelength band of 780 nm (CD (compact disc)-use laser beam), an infrared laser beam with a wavelength band of 650 nm (DVD (digital versatile disc)-use laser beam), and a blue laser beam with a wavelength band of 405 nm (BD-use laser beam) at the optical disk 2, for example. Note that the inside of the optical pickup 1 will be described in detail later.

Audio information and video information obtained by the optical pickup 1 are converted into audio and video by the RF amplifier 31, the DSP 32, the reproduction processing circuit 33, and the output circuit 34 and output from a speaker and a monitor (not shown), respectively. The RF amplifier 31 amplifies audio signals, video signals, and the like from the optical pickup 1. The DSP 32 and the reproduction processing circuit 33 subject signals from the RF amplifier 31 to various kinds of information processing for reproduction (such as video processing). The output circuit 34 subjects signals from the reproduction processing circuit 33 to D/A conversion processing or the like in order to output the signals from the speaker and monitor (not shown).

Furthermore, the DSP 32 performs arithmetic processing on the basis of signals output from a photodetector 20 (see FIG. 2) and produces focus error signals, focus servo signals, tracking error signals, and the like.

The CPU 41 receives information from the operating component 44 and transfers it to the DSP 32, and also transfers information from the DSP 32 to the display component 43.

The driver 42 controls the operation of the feed motor 51 and the spindle motor 52 based on instructions from the DSP 32. The feed motor 51 moves the optical pickup 1 in the radial direction of the optical disk 2. The spindle motor 52 drives the optical disk 2 in the rotational direction.

Moreover, the driver 42 also controls the operation of an actuator 21 and a BEX (beam expander) motor 22 (see FIG. 2) inside the optical pickup 1.

Figure 2:
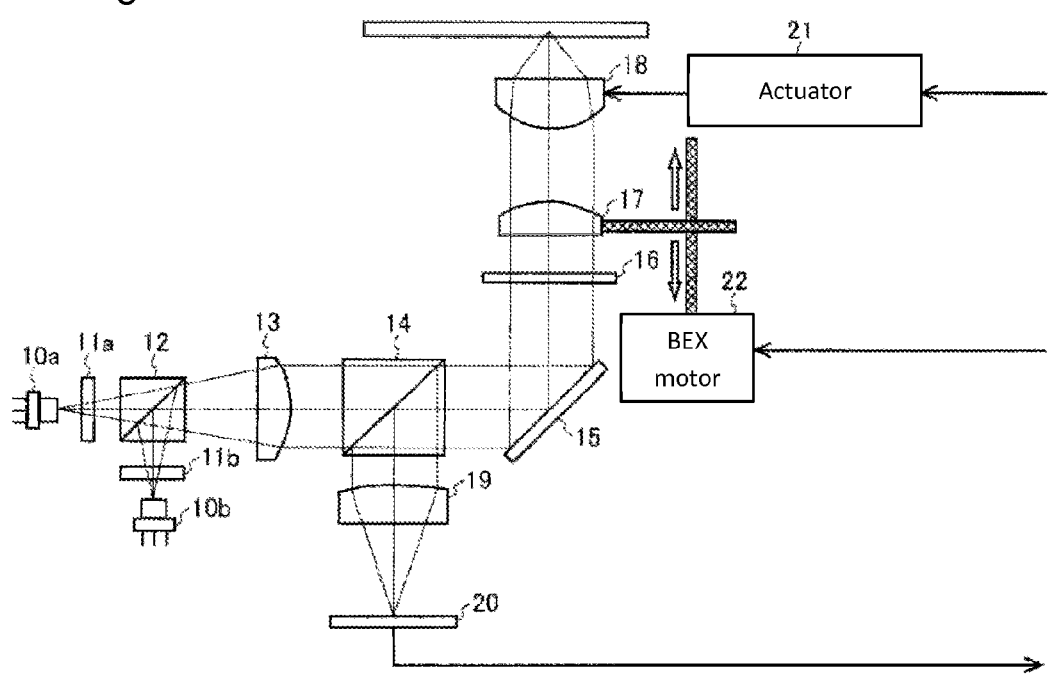
FIG. 2 is a diagram showing the schematic configuration of the optical pickup provided for the optical disk device according to one preferred embodiment of the present invention.

Next, the schematic configuration of the optical pickup 1 provided for the optical disk device according to one preferred embodiment of the present invention is shown in FIG. 2.

The optical pickup 1 preferably includes a first light source 10a, a second light source 10b, a first grating 11a, a second grating 11b, a dichroic prism 12, a collimating lens 13, a beam splitter 14, a raising mirror 15, a quarter-wave plate 16, a collimating lens 17, an objective lens 18, a detecting lens 19, the photodetector 20, the actuator 21, and the BEX motor 22.

The first light source 10a is a two-wavelength integrated type of LD that can emit an infrared laser beam with a wavelength band of 780 nm (CD-use laser beam) and an infrared laser beam with a wavelength band of 650 nm (DVD-use laser beam). The second light source 10b is an LD that can emit a blue laser beam with a [wavelength] band of 405 nm (BD-use laser beam), for example.

The first grating 11a diffracts the laser beam emitted from the first light source 10a and outputs the diffracted light to the dichroic prism 12. The second grating 11b diffracts the laser beam emitted from the second light source 10b and outputs the diffracted light to the dichroic prism 12.

The dichroic prism 12 transmits the diffracted light that is output from the first grating 11a and reflects the diffracted light that is output from the second grating 11b. Then, the dichroic prism 12 causes optical axes of the diffracted light emitted from the first grating 11a and the second grating 11b to coincide. The diffracted light (laser beam) that is transmitted or reflected at the dichroic prism 12 is sent to the collimating lens 13.

The collimating lens 13 converts the laser beam sent from the dichroic prism 12 into parallel light. The laser beam transformed into parallel light by the collimating lens 13 is sent to the beam splitter 14.

The beam splitter 14 functions as a light separating element that separates incident laser beams. The beam splitter 14 transmits the light beam sent from the collimating lens 13 and guides it to a surface of the optical disk 2, and also reflects the light reflected by the optical disk 2 and guides it to a surface of the photodetector 20. The laser beam that has been transmitted by the beam splitter 14 is sent to the raising mirror 15.

The raising mirror 15 reflects the light beam transmitted by the beam splitter 14 and guides it to the optical disk 2. The raising mirror 15 is in a state of being tilted at a 45° angle with respect to the optical axis of the laser beam sent from the beam splitter 14, so the optical axis of the laser beam reflected by the raising mirror 15 is substantially perpendicular to the recording surface of the optical disk 2.

The quarter-wave plate 16 has the function of converting linearly polarized light into circularly polarized light and converting circularly polarized light into linearly polarized light, converts the laser beam of linearly polarized light reflected by the raising mirror 15 into circularly polarized light and sends it to the collimating lens 17, and converts the laser beam of circularly polarized light reflected by the optical disk 2 into linearly polarized light and sends it to the raising mirror 15.

The collimating lens 17 is movable in the optical axis direction (up-and-down direction in FIG. 2) by the BEX motor 22.

The state of the laser beam emitted from the collimating lens 17 can be switched between divergent light and convergent light according to the movement of the collimating lens 17. Then, spherical aberration can be corrected by changing the state of the laser beam emitted from the collimating lens 17 in this manner. The laser beam emitted from the collimating lens 17 is sent to the objective lens 18.

The objective lens 18 focuses the laser beam sent from the collimating lens 17 on the recording surface of the optical disk 2. In addition, the objective lens 18 is movable by the actuator 21, which will be described later, in the up-and-down direction and the left-and-right direction in FIG. 2, for example, and the position thereof is controlled on the basis of a focus servo signal and a tracking servo signal.

The light reflected by the optical disk 2 passes through the objective lens 18, the collimating lens 17, and the quarter-wave plate 16, in that order, and is reflected by the raising mirror 15, after which it is further reflected by the beam splitter 14 and is focused by the detecting lens 19 on a light-receiving element provided on the photodetector 20.

Figure 3:
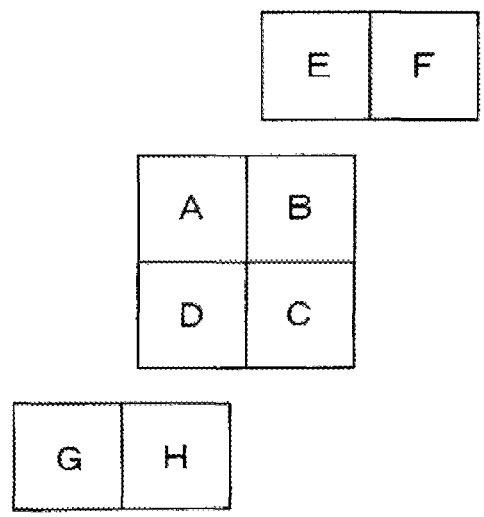
FIG. 3 is a diagram showing the light-receiving regions of a photodetector.

The photodetector 20 converts optical information received using a photodiode or other such light-receiving element into an electrical signal and outputs the electrical signal to the DSP 32 (see FIG. 1). As shown in FIG. 3, the photodetector 20 preferably includes main light-receiving regions A through D that are preferably split into four equal portions laterally and longitudinally, sub light-receiving regions E and F that are preferably split into two equal portions laterally, and sub light-receiving regions G and H that are preferably split into two equal portions laterally, and outputs an electrical signal by performing photoelectric conversion individually for each region. The main light-receiving regions A through D are regions that receive zero-order diffracted light (main beam), and the sub light-receiving regions E through H are regions that receive first-order diffracted light (sub beam). The DSP 32 can produce a focus error signal by subtracting the sum of adding an electrical signal SB for region B to an electrical signal SD for region D from the sum of adding an electrical signal SA for region A to an electrical signal SC for region C and can produce a focus sum signal by adding up the electrical signals SA through SD for regions A through D. Furthermore, the DSP 32 preferably includes a tracking error signal generation circuit that produces tracking error signals from the electrical signals SA through SH for regions A through H. Note that details of the tracking error signal generation circuit will be described later.

The actuator 21 moves the objective lens 18 in the radial direction of the optical disk 2 according to an objective lens drive signal produced and output by the driver 42 (see FIG. 1).

The actuator 21 can perform, in addition to a tracking operation in which the objective lens 18 is moved in a direction along the recording surface of the optical disk 2, a tilting operation in which the objective lens 18 is tilted such that the optical axis of the laser beam emitted from the objective lens 18 pivots and a focusing operation in which the objective lens 18 is moved so as to be close to and away from the optical disk 2.

Figure 4:
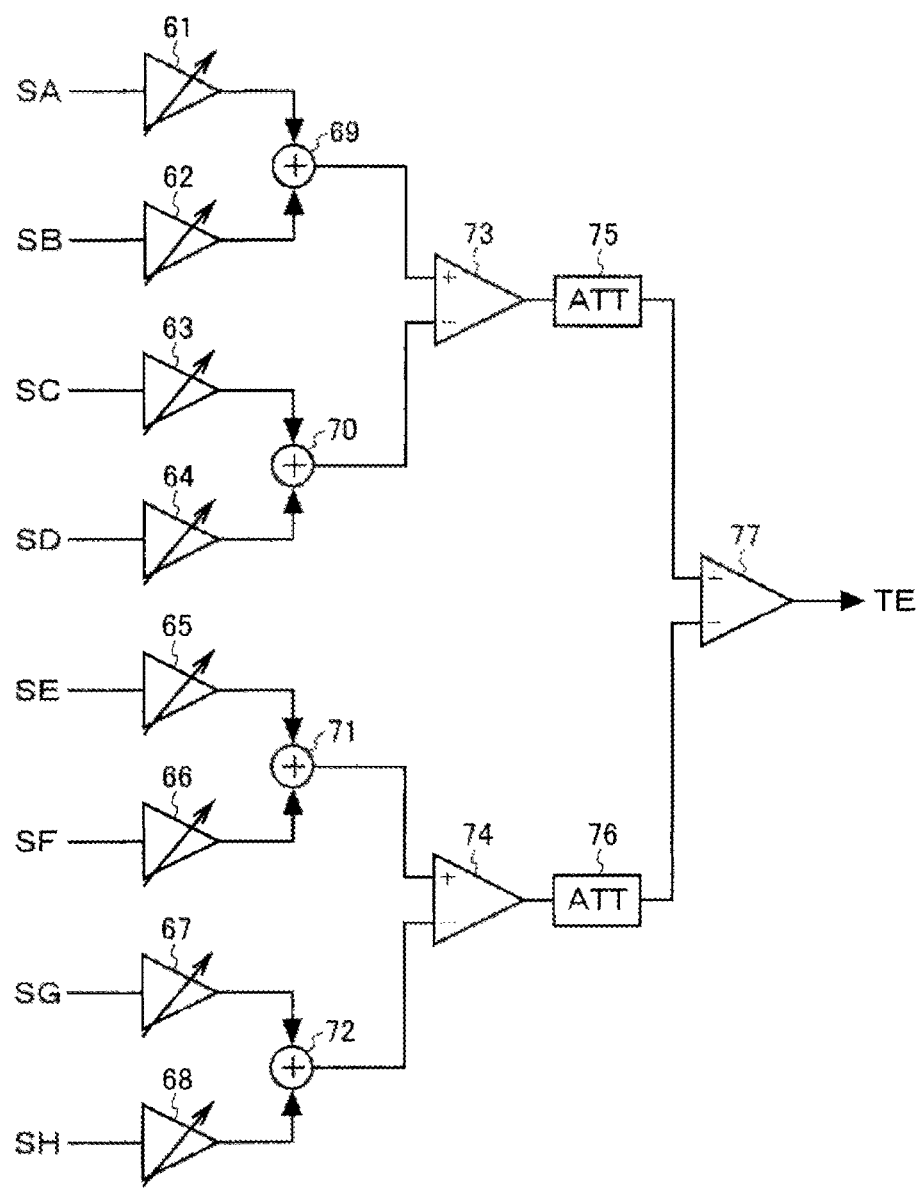
FIG. 4 is a diagram showing the schematic configuration of a tracking error signal generation circuit.

Next, the schematic configuration of the tracking error signal generation circuit possessed by the DSP 32 is shown in FIG. 4. The tracking error signal generation circuit shown in FIG. 4 preferably includes variable gain amplifiers 61 through 68, adders 69 through 72, a main differential amplifier 73, a sub differential amplifier 74, attenuators 75 and 76, and a composite differential amplifier 77. Although not depicted in FIG. 4, the tracking error signal generation circuit included in the DSP 32 also preferably includes a balance adjustment circuit that adjusts the balance of tracking error signals, an offset adjustment circuit that adjusts the offset of various signals within the tracking error signal generation circuit, and the like.

The adder 69 adds the electrical signal SA amplified by the variable gain amplifier 61 to the electrical signal SB amplified by the variable gain amplifier 62 and outputs the added signal to a non-inverting input terminal of the main differential amplifier 73. The adder 70 adds the electrical signal SC amplified by the variable gain amplifier 63 to the electrical signal SD amplified by the variable gain amplifier 64 and outputs the added signal to an inverting input terminal of the main differential amplifier 73. The main differential amplifier 73 produces a main push-pull signal from the output signals of the adders 69 and 70 and outputs the main push-pull signal to the attenuator 75. The attenuator 75 attenuates the main push-pull signal and outputs the attenuated signal to a non-inverting input terminal of the composite differential amplifier 77.

The adder 71 adds the electrical signal SE amplified by the variable gain amplifier 65 to the electrical signal SF amplified by the variable gain amplifier 66 and outputs the added signal to a non-inverting input terminal of the sub differential amplifier 74. The adder 72 adds the electrical signal SG amplified by the variable gain amplifier 67 to the electrical signal SH amplified by the variable gain amplifier 68 and outputs the added signal to an inverting input terminal of the sub differential amplifier 74. The sub differential amplifier 74 produces a sub push-pull signal from the output signals of the adders 71 and 72 and outputs the sub push-pull signal to the attenuator 76. The attenuator 76 attenuates the sub push-pull signal and outputs the attenuated signal to the inverting input terminal of the composite differential amplifier 77.

The composite differential amplifier 77 produces a tracking error signal TE from the main push-pull signal attenuated by the attenuator 75 and the sub push-pull signal attenuated by the attenuator 76.

Figure 5:
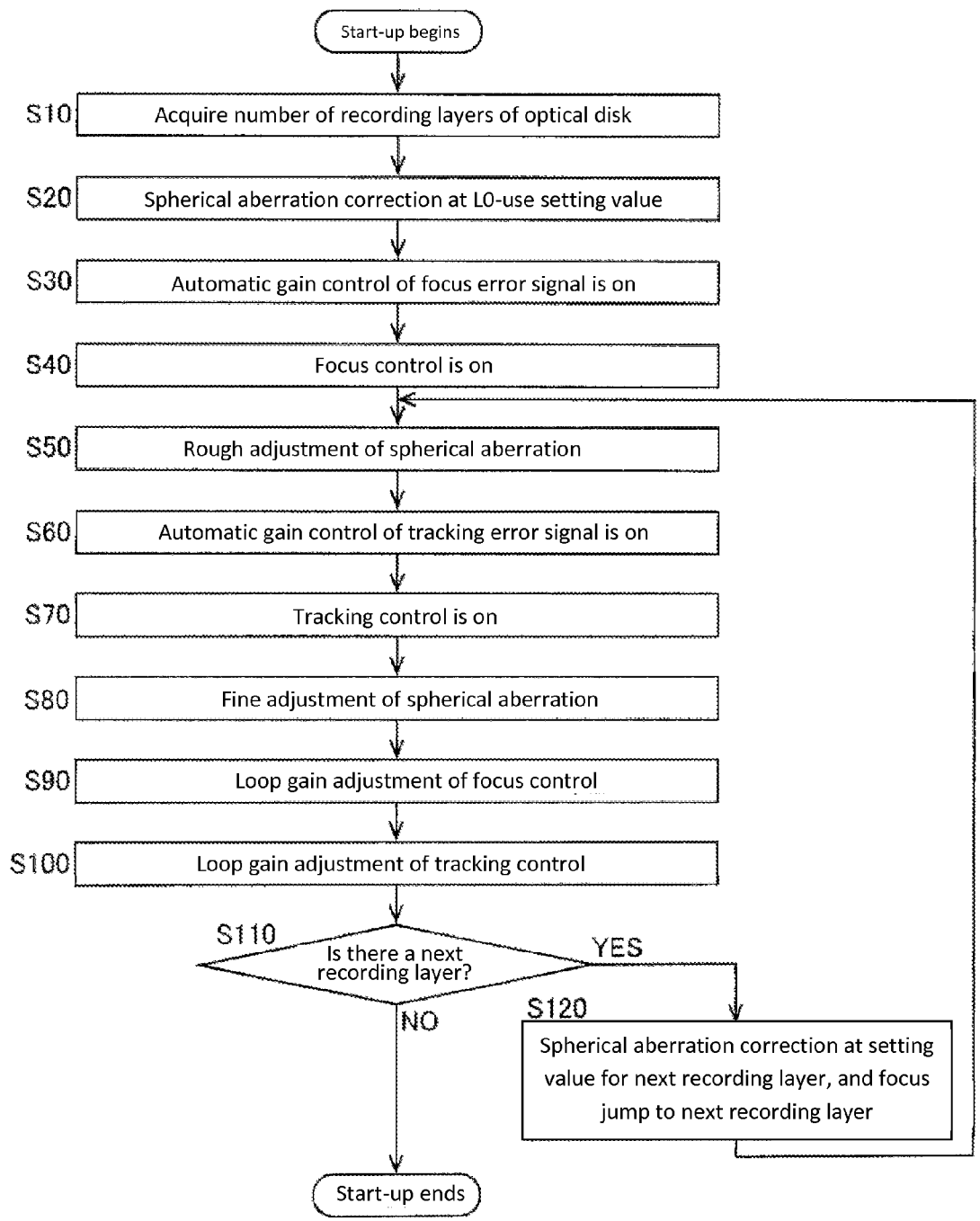
FIG. 5 is a flowchart illustrating the start-up operation of the optical disk device according to one preferred embodiment of the present invention.

With the optical disk device according to one preferred embodiment of the present invention constituted as described above, when the optical disk 2 is inserted into the optical disk device, the type of the optical disk 2 is determined, and if this determination result is BD, the start-up operation of the operational flow shown in FIG. 5 is carried out.

In the operational flow shown in FIG. 5, first, the DSP 32 acquires the number of recording layers of the optical disk by performing a focus search (step S10).

Next, the BEX motor 22 moves the collimating lens 17 by the L0-use setting value measured ahead of time in the course of manufacturing the device, etc., to perform spherical aberration correction (step S20), after which the DSP 32 places the automatic gain control of the focus error signal in an ON state (step S30) and places focus control in an ON state by pulling the focus control into the recording layer L0 farthest away from the side on which the laser beam is incident (step S40).

Then, the DSP 32 performs rough adjustment of spherical aberration correction using a tracking error signal as an index (step S50). Note that the details of step S50 will be described later. Upon completion of the processing in step S50, automatic gain control of the tracking error signal is placed in an ON state (step S60). Note that in cases where the automatic gain control of the tracking error signal has been in an ON state, the DSP 32 adjusts the amount of attenuation of the attenuators 75 and 76 according to the change in the sum of the electrical signals SA through SH output from the photodetector such that the amplitude level of the tracking error signal will be at a specified level. Moreover, various kinds of adjustments to the tracking error signal are also made in step S60. The processing of step S60 is executed only immediately after the rough adjustment of spherical aberration at the recording layer L0 and is not executed immediately after the rough adjustment of spherical aberration at recording layers other than that.

In step S70 that follows step S60, the DSP 32 pulls in tracking control and places the tracking control in an ON state. Afterward, the DSP 32 performs fine adjustment of spherical aberration correction using the RF signal that is output from the RF amplifier 31 as an index (step S80).

When the fine adjustment of spherical aberration correction is completed, the DSP 32 performs loop gain adjustment of focus control and loop gain adjustment of tracking control (steps S90 and S100).

Afterward, furthermore, the DSP 32 determines whether or not there is a next recording layer, that is, whether or not there is a recording layer that has yet to undergo the various kinds of adjustments described above (step S110).

If there is a next recording layer (the recording layer next farthest from the side on which the laser beam is incident, after the recording layer that underwent the various kinds of adjustments immediately before) (Yes in step S110), the DSP 32 performs spherical aberration correction by causing the BEX motor 22 move the collimating lens 17 by the next recording layer-use setting value measured ahead of time in the course of manufacturing the device, etc., and then the DSP 32 controls the optical pickup 1 via the driver 42 so as to jump the focus to the next recording layer (step S120), after which the flow moves to step S50.

On the other hand, if there is no next recording layer (No in step S110), adjustment has been completed for all the recording layers, and thus a start-up operation for when the optical disk 2 inserted into the device is a BD has ended. The setting values for the respective recording layers measured ahead of time in the course of manufacturing the device, etc., may be stored in advance in a nonvolatile memory built into the DSP 32, for example.

Figure 6:
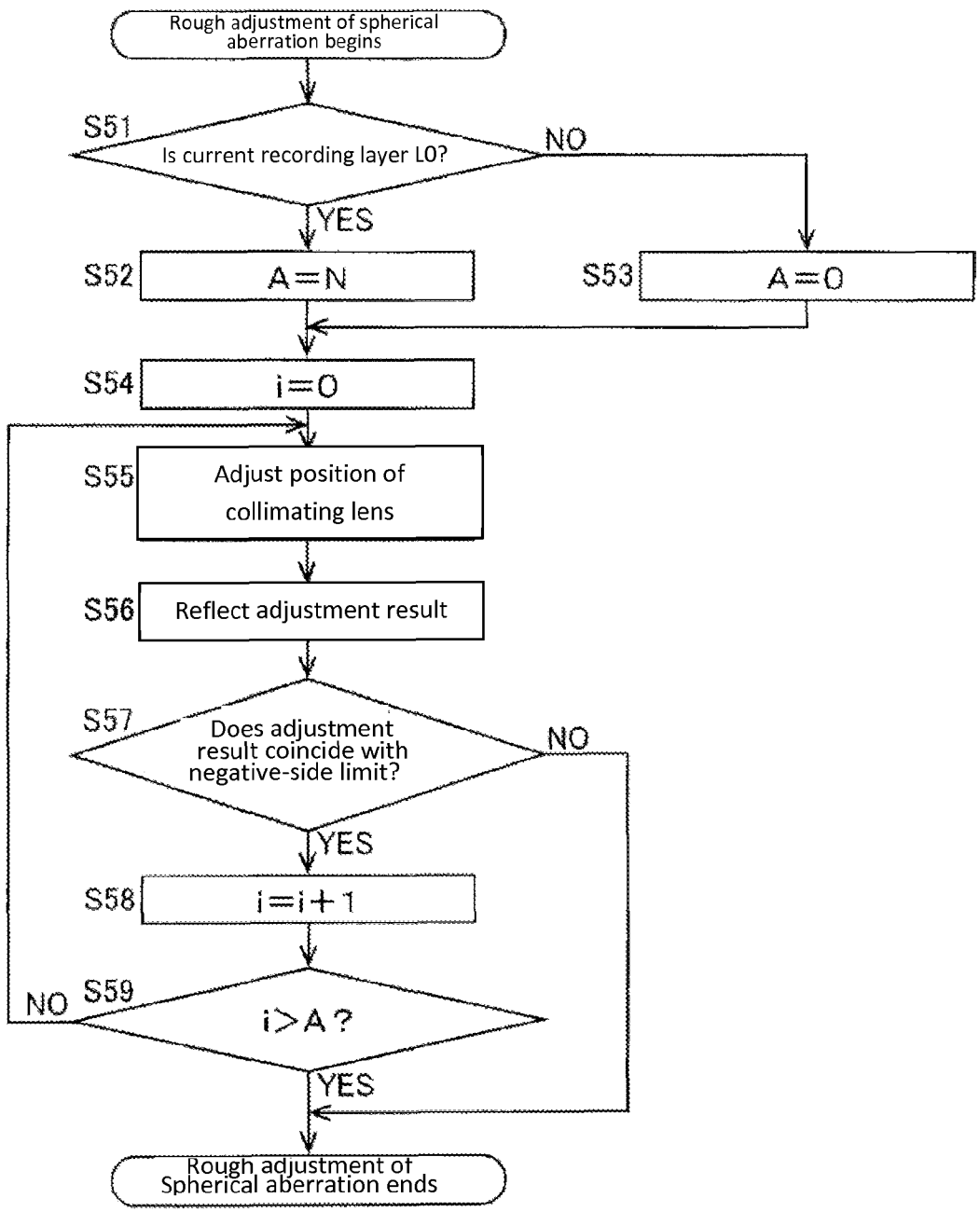
FIG. 6 is a flowchart of the details of rough adjustment of spherical aberration performed by the optical disk device according to one preferred embodiment of the present invention.

The rough adjustment of spherical aberration correction in step S50 described above is preferably performed as shown in the operational flow shown in FIG. 6.

In the operational flow shown in FIG. 6, first, the DSP 32 determines whether or not the recording layer performed on the current focus control is L0 (step S51). If the recording layer on which the current focus control is performed is L0 (Yes in step S51), the DSP 32 sets a parameter A indicating the upper limit to the number of retries to N (N is any natural number), and the flow then moves to step S54; if the recording layer on which the current focus control is performed is not L0 (No in step S51), the parameter A indicating the number of retries is set to 0, and the flow then moves to step S54.

Note that N may be set on the basis of the distance between the recording layer closest to the side on which the laser beam is incident and the recording layer L0 farthest away from the side on which the laser beam is incident of an optical disk having the most recording layers out of optical disks (BDs in the present preferred embodiment) including three or more recording layers on one side with which the optical disk device according to one preferred embodiment of the present invention is compatible. For example, if the optical disk with the most recording layers out the optical disks (BDs in the present preferred embodiment) including three or more recording layers on one side with which the optical disk device according to one preferred embodiment of the present invention is compatible is a BD-QL (quad-layer BD), then N may be set on the basis of the distance of about 46.5 μm, for example, between the recording layer L0 and the recording layer L3. It is desirable that the product of multiplying N by the absolute value of the limit be equal to or greater than the maximum value for the distance between the recording layer L3 and the recording layer L0, and that N be set as small as possible. The distance of about 46.5 μm between the recording layer L0 and the recording layer L3 of a quad-layer BD varies by about 5.0 μm from the standard, so if the limit in step S54, which will be described later, is set to about ±10.3 μm, for example, it is desirable that N be set to 5 (the smallest N that satisfies $10.3 \times N \geq (46.5+5)$), for example.

In step S54, the DSP 32 sets the parameter i indicating the number of adjustment iterations to O. In step S55 that follows step S54, the DSP 32 moves the collimating lens 17 via the driver 42 and the BEX motor 22 and searches for the position of the collimating lens 17 at which the amplification of the tracking error signal is at the highest level. Because a limit is provided to the amount of movement of the movable lens for spherical aberration correction in rough adjustment of spherical aberration correction, during the aforementioned search, the collimating lens 17 can only be moved to the position at which the limit takes effect from the position of the collimating lens 17 at the starting point of step S55.

In step S56 that follows step S55, the DSP 32 moves the collimating lens 17 to the position at which the amplification of the tracking error signal is at the highest level within the searched range.

In step S57 that follows step S56, the DSP 32 determines whether or not the position of the collimating lens 17 moved in step S56 coincides with the limit on the negative side (the side on which the collimating lens 17 moves farther away from the optical disk 2 as a result of executing step S56 than before this step was executed).

If the position of the collimating lens 17 moved in step S56 does not coincide with the limit on the negative side (No in step S57), rough adjustment of spherical aberration is immediately ended.

On the other hand, if the position of the collimating lens 17 moved in step S56 does coincide with the limit on the negative side (Yes in step S57), there is the possibility that the amplification level of the tracking error signal will become higher through a change to the search range, so the DSP 32 increments the parameter i by 1 (step S58), and if the parameter i has not exceeded the parameter A (No in step S59), the flow returns to step S55, and the position of the collimating lens is adjusted again, but if the parameter i incremented in step S58 has exceeded the parameter A (Yes in step S59), the upper retry limit has been reached, so rough adjustment of the spherical aberration is ended so as not to return to step S55.

As a result of the start-up operation as above, when a BD including three or more recording layers on one side is inserted into the device, and focus control that was supposed to be performed on the recording layer L0 is mistakenly performed on a recording layer close to the side on which the laser beam is incident (a recording layer other than L1), the collimating lens 17 can be moved to the position at which spherical aberration is roughly the best at the recording layer close to the side on which the laser beam is incident in the rough adjustment of spherical aberration correction at the recording layer L0 (what is actually in focus is the recording layer close to the side on which the laser beam is incident), so no large deviation occurs in the various kinds of adjustments related to the tracking error signal. Therefore, if focus control that is supposed to be performed on the recording layer L0 is instead mistakenly performed on the recording layer close to the side on which the laser beam is incident, it is possible to avoid ending up in a situation in which the tracking control cannot be placed in an ON state.

In addition, the start-up operation as described above eliminates the need to expand the limit provided for the amount of movement of the collimating lens 17 in rough adjustment of spherical aberration correction, so it is possible to avoid ending up in a situation in which an error occurs in the measurement for some factor (such as stray light) when the focus control is being properly performed on the recording layer L0, and this causes the collimating lens 17 to move far enough that the tracking control cannot be placed in an ON state.

Note that in the present preferred embodiment, a collimating lens is preferably used as the movable lens for spherical aberration correction disposed in the optical system of the optical pickup, but the present invention is not limited to this, and the present invention can also be applied, for example, to an optical disk device or the like in which a movable lens for spherical aberration correction is part of a plurality of lenses that make up a beam expander.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An optical disk device that is compatible with optical disks including three or more recording layers on one side, the optical disk device comprising:
   - an optical pickup that shines light on an optical disk and that detects light reflected from the optical disk using a photodetector;
   - a tracking error signal generation device that generates a tracking error signal by processing an electrical signal that is output from the photodetector; and
   - a movable lens position adjustment device that controls adjustment of a position of a movable lens for spherical aberration correction disposed in the optical pickup; wherein
   - when the optical disk including three or more recording layers on one side is inserted into the optical disk device, the movable lens position adjustment device performs adjustment using as an index the tracking error signal provided with a limit to an amount of movement of the movable lens for spherical aberration correction at start-up of the optical disk device and sets an upper limit to a number of retries of the adjustment at the recording layer farthest away from a side on which a laser beam is incident to 1 or more.

2. The optical disk device according to claim 1, wherein when the optical disk including three or more recording layers on one side is inserted into the optical disk device, the movable lens position adjustment device sets the upper limit to the number of retries of the adjustment in recording other than at the recording layer farthest away from the side on which the laser beam is incident to zero.

3. The optical disk device according to claim 1, wherein a product of multiplying an absolute value of the limit by the upper limit to the number of retries of the adjustment at the recording layer farthest away from the side on which the laser beam is incident is equal to or greater than a maximum distance from a standard between the recording layer that is farthest away from the side on which the laser beam is incident and the recording layer that is closest to the side on which the laser beam is incident on an optical disk with the greatest number of recording layers out of the optical disks including three or more recording layers on one side.

4. The optical disk device according to claim 1, wherein the optical disk device is compatible with a disk that is compliant with a BDXL standard.

* * * * *